Sept. 6, 1960           C. D. SNELLING           2,951,351

CONTROLLED CHILLING AT AN ACCELERATING RATE

Filed April 1, 1958

INVENTOR.
Charles D. Snelling
BY
Henry H. Snelling
ATTORNEY

United States Patent Office 2,951,351
Patented Sept. 6, 1960

2,951,351
CONTROLLED CHILLING AT AN ACCELERATING RATE

Charles D. Snelling, R.D. #1, Breinigsville, Pa.

Filed Apr. 1, 1958, Ser. No. 725,668

5 Claims. (Cl. 62—158)

This invention relates to lowering the temperature of a liquid refrigerating medium such as ethyl alcohol by the expansion of a liquified gas such as carbon dioxide and has for its principal object the provision of a method and apparatus for mixing these in a manner to form a relatively quiet mist of the alcohol with carbon dioxide vapor, droplets, and particles of Dry Ice, and then to return the alcohol portion of the mixture, with release of all or substantially all of the carbon dioxide, to the initial pool of alcohol which contains the articles to be frozen.

An important object of the invention is to provide a machine that can operate to freeze material such as biotics at a controlled rate of chilling in a small quantity of refrigerant, usually from ten to fifteen gallons but which may be a single gallon, or even less, and with complete absence of the vigorous agitation characteristic of the action in the large installations. This object is achieved by providing a small pool of alcohol, withdrawing a portion of the alcohol in a stream of relatively small diameter and returning it to the container or pool in a stream of much larger diameter, the return material being elevated above the pool by the expansion of the liquid carbon dioxide, thus making the larger pipe a gas lift, as a mixture of alcohol and liquid carbon dioxide cannot be pumped by the usual mechanism.

A further object of the invention is to provide a method and apparatus which could readily be manually operated but which I prefer to have operated entirely automatically whereby the pool of alcohol is chilled initially at a relatively slow chosen rate and the rate of cooling is increased at a constantly accelerated rate determined by the pool temperature as the alcohol is chilled to the desired low final degree.

A still further and fairly specific object of the invention is to provide a method of freezing biotics such as bull semen in a manner best to preserve the viability and efficiency of the material to be frozen, and to construct a dependable, versatile freezer to carry out this method. In this object a temperature or pressure responsive means immersed in the main body of the alcohol governs the opening and closing of one and preferably more valves regulating the flow through the jets of liquid carbon dioxide which discharge into the small stream of alcohol which thereupon becomes a further chilled mist and may rise in a confined return pipe and thence be discharged as a liquid by gravity into the main pool, preferably first passing a separator which aids in releasing the carbon dioxide. The increasing opening of the solenoid operated valves controlling the feed of the liquid carbon dioxide obviously increases the rate of fall of the temperature of the returned alcohol and in turn the temperature of the pool, which finally drops to a final figure which is below −100°, all temperatures mentioned being in the Fahrenheit scale.

Experience has shown that in the freezing of semen the time-temperature relationship is exceptionally important. The viability of frozen semen is reduced when the temperature drop in the freezing cycle is too rapid, and also when it is too slow. In other words, maximum viability of the semen is obtained when the temperature of the semen is reduced at a certain rate during the freezing process, and this rate changes at different temperatures during the freezing cycle. Experience with treating semen from different breeders indicates that this time-temperature curve may vary slightly with different strains of stock. The freezing unit illustrated follows the time-temperature curve that the user has found most desirable with his particular line of bulls. In the automatic machine this is done by merely changing the configuration of the outer surface of the cam.

Figure 1:
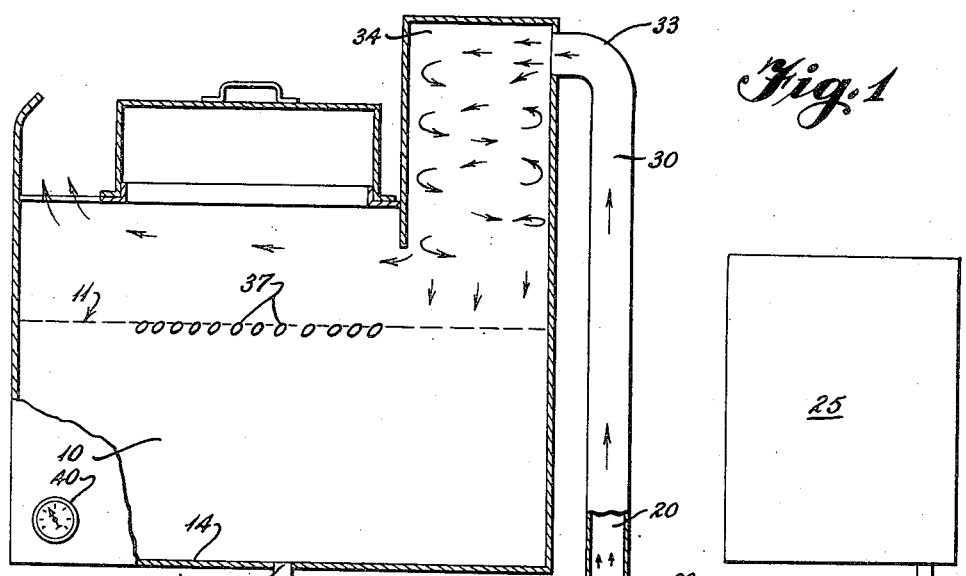
Fig. 1 is a schematic view of a manually controlled system.

In Fig. 1 the freezing tank 10 is filled to the fluid level 11 with a liquid organic refrigerant with a suitably low boiling point and a freezing point substantially below 103° F., preferably industrial grain alcohol. The pipe 12 which may lead from the bottom 14 as at 15 conveys a small stream of alcohol to a mixing nozzle 16 in which there is at least one jet and preferably three, 17, 18 and 19, each controlled by its valve 17a, 18a, or 19a. The diameters of the jets are in desired proportion, as for example 1:2:8, or in dimensions, assuming the inside diameter of the return pipe 20 as 2"; 1/64", 1/32", and 1/8". The smaller jet 17 is just large enough to pass sufficient liquid carbon dioxide to prevent the return pipe 20 from filling with alcohol to a height even with the normal surface 11 in the tank. With a 2" return pipe, the withdrawal pipe would best be 3/4" diameter and the tank about 15" each way and filled about two-thirds full with about ten gallons of refrigerant. If only one jet is used it would be 19 in which case valve 19a could be dispensed with. With the three jets, valve 17a is rarely used as it is constantly open while the machine is being operated, the function of its jet 17 being to insure a flow of refrigerant liquid through pipe 12, nozzle 16, pipe 20 and cyclone separator 34.

Liquid carbon dioxide from container 25 is conveyed by pipe 26 provided with a shut-off valve 27 to the jet or jets in the nozzle 16. With valve 27 open as it is during use the expanding liquid $CO_2$ discharges centrally of the return pipe 20 and the flow draws alcohol from pipe 12 past check valve 28, the alcohol seemingly rising in inverted conical shape as at 29 to the sides of the return pipe 20, becoming a mist which rises, and as it passes a zone 30 above the pool surface level the mixture becomes less slushy as by this time all of the Dry Ice or solid $CO_2$ has usually become a liquid or a gas or a combination of both.

The return pipe 20, usually vertical, turns at right angles now to horizontal as at 33 so that its contents discharge into the freezing tank 10, preferably through a cyclone centrifugal separator 34 discharging above the liquid level so the $CO_2$ may readily escape while the chilled alcohol falls directly into the pool, being delivered tangentially so the liquid droplets are forced by the whirling motion against the cylindrical sides of the separator and run down while the gases and vapors pass nearer the axis and exiting to the left in Fig. 1. The material to be frozen may be supplied in capsules 37, the specific material in the illustrative example being bull semen in ampules of appropriate size.

A thermometer 40 of desired type indicates the temperature of the alcohol in the pool. The ampules 37 are brought to the freezing unit 10 at the temperature of the usual refrigerator, say about 40° F. The temperature in the pool should therefore initially be the same and the attendant would open the valve 27 a bit more if only the one valve were used. With the three jets preferred he would open the valve 18a to an extent to provide a temperature drop in the freezing tank of one degree per minute for ten minutes, that is until the tank temperature falls from 40° F. to 30° F. At this point the attendant would open valve 18a still further to double the temperature drop to two degrees per minute for the next twenty-five minutes during which time the temperature falls to —20° F. From this point on the attendant opens the larger valve 19a in addition to secure a constantly increasing temperature drop which might reach as high as 20° to 30° per minute at my chosen final temperature of —103° F. My preference is to keep the rate of temperature drop while approaching the minimum degree of cold to ten degrees per minute as this maximum fall gives a uniformly superior quality of frozen semen which breeding associations find completely dependable.

The final temperature of —103° F. is critical in one direction as a variance of as little as three or four degrees warmer is harmful and a still higher temperature for storage should never be used. In the other direction, however, a lower temperature may be advisable except for greater cost as it seems to be beneficial. Year long storage as low as —320½° F. (the boiling point of liquid nitrogen) has shown no harmful effects upon the viability of frozen semen.

Although I prefer to use grain alcohol as the liquid medium into which I inject liquid carbon dioxide, many other liquids are suitable for the same purpose, as for example methyl alcohol, propyl alcohol and isopropyl alcohol. I have also used successfully ketones, such as acetone and butanone and can successfully use any organic liquid of low volatility and low freezing point that is readily miscible with liquid carbon dioxide. My experiments indicate that any mixture comprising methanol, ethanol, propanol, isopropanol, acetone, and butanone can be successfully used, without regard to the proportions of the constituents used, and accordingly the liquid medium can be any liquid organic mixture that has a suitably low boiling point and a freezing point substantially lower than —103° F. and which dissolves and is readily miscible with liquid carbon dioxide.

Figure 2:
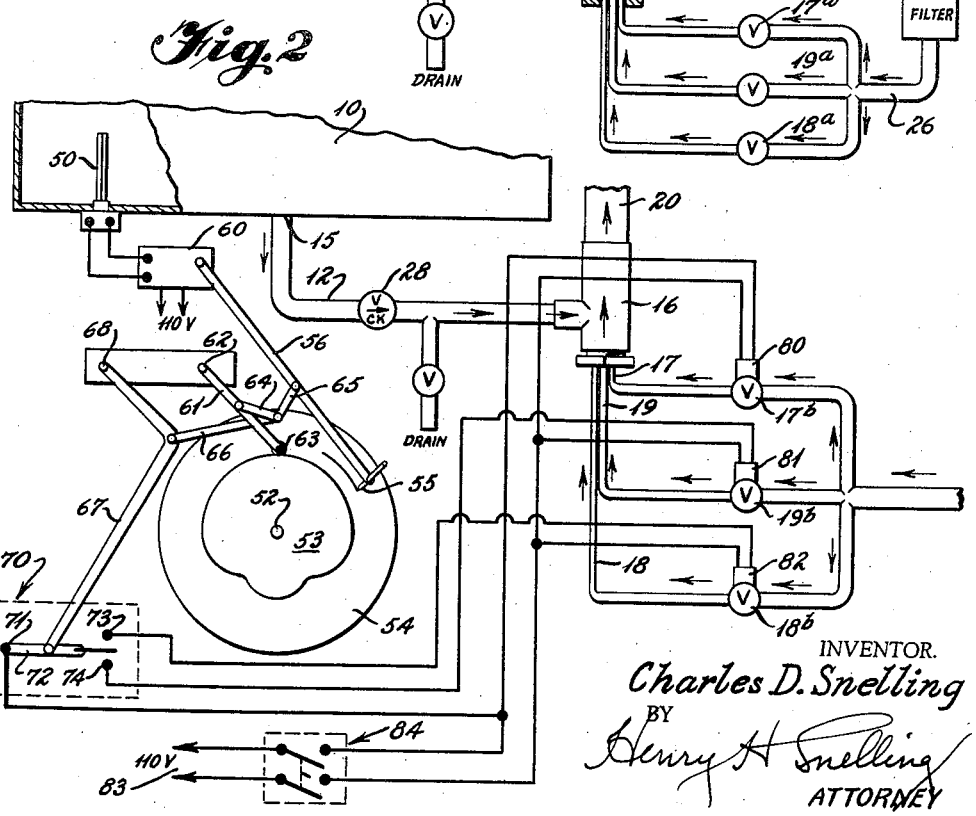
Fig. 2 is a similar view of an automatic system.

As the machine is marketed in automatic standard model, the thermometer 40 which can be read from the outside of the tank 10 is replaced by a thermocouple 50 and a Minneapolis-Honeywell indicating control thermometer such as Brown electrovane 602C. A device of this kind is shown diagrammatically in Fig. 2 and has a motor driven central shaft or arbor 52, the motor (not shown) sometimes being clock mechanism but usually electrical. On the arbor 52 is mounted a cam 53 of special design for this use and a disc on which is mounted the usual paper time-temperature chart 54 on which the pen 55 at the end of arm 56 traces the temperature in the tank 10 as recorded by the thermocouple 50 connected to the usual amplifier 60 which controls movement of the arm 56. An arm 61 pivoted at 62 carries at its free end a roller 63 which rests on the peripheral edge of the cam 53 which therefore governs the position of arm 61. The two short links 64 and 65 join the arms 56 and 61 and a longer link 66 is pivoted to their junction so that the arm 67 of the relay 70 responds to the relative positions of arms 56 and 61 being pivoted at 68 and hence moves contact needle 72 pivoted at 71 to touch either terminal 73 to the control valve 18b so as to supply a medium quantity of carbon dioxide gas, or to terminal 74 which opens the supply to the main jet 19 and provides the fastest rate of chilling. The jets are numbered 17, 18, and 19 in this Fig. 2 but the three solenoid controlled valves are given the subscript "b" to distinguish from the manual valves 17a, 18a, and 19a.

What I claim is:

1. In combination, a freezing tank, a refrigerant in said tank at atmospheric pressure, a nozzle having a plurality of valve-controlled jets, a withdrawal passageway leading from the tank to the nozzle, means for discharging a liquefied gas under pressure to the nozzle, a return pipe leading from the nozzle upwardly to a point above the tank and forming a gas lift to return the refrigerant to the tank, and means controlled by the temperature of the refrigerant in the tank for opening the valves to increase the rate of supply of the liquefied gas and consequently the rate of chilling of the refrigerant.

2. In combination, a freezing tank open to atmosphere and adapted to be filled to a chosen level by a liquid refrigerant, a withdrawal and return pipe comprising two sections, one of smaller cross-section and the other a vertical pipe of larger cross-section into which the smaller pipe discharges, a plurality of jets of different sizes discharging into the larger pipe and acting as injectors to draw liquid refrigerant from the tank through the smaller pipe, piping for discharging a liquefied gas under pressure to the jets, a valve for each jet, mechanism for opening and closing the valves in desired timed sequence, and means controlled by the temperature in the tank for varying the timed sequence, whereby the liquid refrigerant may be chilled to a desired low final degree at a changing rate.

3. The combination of claim 2 in which the larger pipe discharges into a cyclone separator above the liquid level in the tank and the cyclone separator discharges the chilled refrigerant to the tank and the gas is released to the atmosphere.

4. In combination, a freezing tank filled to a chosen height with a liquid refrigerant, a reservoir containing a liquefied gas under pressure, a withdrawal pipe leading from the freezing tank, a gas-lift return pipe connecting the withdrawal pipe with the freezing tank above its liquid level, a plurality of jets discharging into the return pipe proximate the connection with the withdrawal pipe to form a mist with the liquid refrigerant, valved piping connecting the jets with the reservoir, one of said jets discharging at a rate to pass sufficient liquid gas from the reservoir to the return pipe to prevent the latter from filling with liquid refrigerant to a height even with said chosen level in the freezing tank.

5. In combination, a freezing tank filled to a chosen height with a liquid refrigerant, a withdrawal pipe leading from the tank below said chosen height, a return pipe of at least five times the area of the withdrawal pipe connecting the withdrawal pipe with the tank above said chosen level, means for discharging a plurality of parallel streams of liquid carbon dioxide into the return pipe to inject the liquid from the withdrawal pipe as a mist, and means to separate the gaseous carbon dioxide from the liquid refrigerant and conveying the latter by gravity back to the tank.

References Cited in the file of this patent

UNITED STATES PATENTS

| | | |
|---|---|---|
| 552,481 | Kreusler | Dec. 31, 1895 |
| 2,137,902 | Walter | Nov. 22, 1938 |
| 2,167,667 | McMechan | Aug. 1, 1939 |
| 2,255,356 | Harris et al. | Sept. 9, 1941 |
| 2,590,061 | Ash | Mar. 18, 1952 |